(12) United States Patent
Shimizu et al.

(10) Patent No.: US 7,903,535 B2
(45) Date of Patent: Mar. 8, 2011

(54) OPTICAL INFORMATION RECORDING MEDIUM AND MANUFACTURING METHOD OF THE SAME

(75) Inventors: Atsuo Shimizu, Gunma (JP); Toru Fujii, Gunma (JP); Masashi Satoh, Gunma (JP); Isao Okitsu, Osaka (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 928 days.

(21) Appl. No.: 11/243,130

(22) Filed: Oct. 4, 2005

(65) Prior Publication Data

US 2006/0083155 A1    Apr. 20, 2006

(30) Foreign Application Priority Data

Oct. 4, 2004    (JP) ................... 2004-291763

(51) Int. Cl.
   *G11B 7/24* (2006.01)
(52) U.S. Cl. .................... 369/275.4; 369/275.1
(58) Field of Classification Search ............... 369/275.1,
   369/275.4, 44.27; 720/718; 428/64.1, 64.4,
   428/64.2; 430/321, 320, 270.11, 270.13
   See application file for complete search history.

(56) References Cited

U.S. PATENT DOCUMENTS

| | | | | |
|---|---|---|---|---|
| 5,890,818 | A | * | 4/1999 | Sansone ................ 400/103 |
| 5,946,286 | A | * | 8/1999 | Bahns ................ 369/275.3 |
| 6,894,961 | B1 | * | 5/2005 | Osakabe ............... 369/47.28 |
| 6,894,962 | B1 | * | 5/2005 | Nishiuchi et al. ........ 369/47.51 |
| 2002/0081414 | A1 | * | 6/2002 | Matsukawa et al. ...... 428/64.4 |
| 2003/0016603 | A1 | * | 1/2003 | Tomita ................ 369/47.3 |
| 2003/0076775 | A1 | * | 4/2003 | Sato et al. ............ 369/275.3 |
| 2003/0084460 | A1 | * | 5/2003 | Chung et al. ............. 725/142 |
| 2005/0007913 | A1 | * | 1/2005 | Kim et al. ............. 369/47.21 |
| 2005/0169158 | A1 | * | 8/2005 | Abe et al. ............. 369/275.3 |

FOREIGN PATENT DOCUMENTS

| | | |
|---|---|---|
| JP | 05-012710 A | 1/1993 |
| JP | 06-036287 A | 2/1994 |
| JP | 10-188361 | 7/1998 |
| JP | 10188361 A * | 7/1998 |
| JP | 2001-101791 | 4/2001 |
| JP | 2001-110062 | 4/2001 |
| JP | 2001-325746 A | 11/2001 |
| JP | 2006-079773 A | 3/2006 |
| JP | 2006-085791 A | 3/2006 |
| WO | WO 02/37483 | 5/2002 |

* cited by examiner

*Primary Examiner* — Joseph Haley
*Assistant Examiner* — Nicholas Lee
(74) *Attorney, Agent, or Firm* — Law Office of Katsuhiro Arai

(57) ABSTRACT

There is provided a new medium structure to record a bar code for copyright protection or the like in an optical information recording medium capable of recording and reproducing information by a laser with respect to a dye. When a laser beam 30 is irradiated and an optical disc 10 is rotation in the direction of an arrow F, the dye of a recording layer is decomposed, a mark piece MA of a bar code 20 is formed, and a substrate is deformed by heat generated by the dye decomposition. Next, the position of the laser beam 30 is shifted to a position where a part overlaps with the mark piece MA, and when the optical disc is similarly rotated in the direction of the arrow F, a mark piece MB is formed to overlap with the mark piece MA. The above processing is repeated, so that the length of a bar is sequentially lengthened, and the bar code with a length along the standard is formed.

7 Claims, 4 Drawing Sheets

FIG. 3
(A)
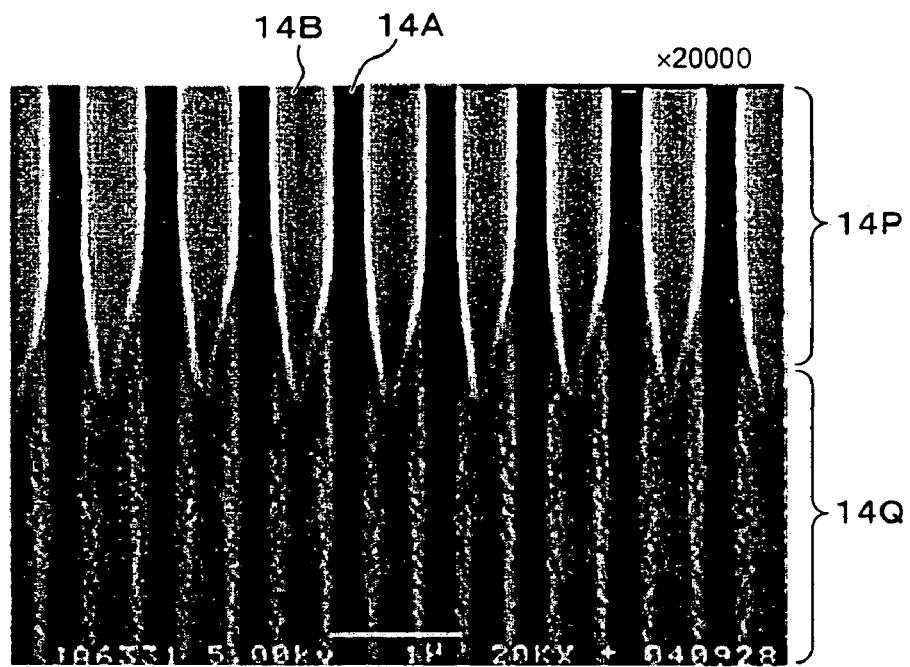
(B)
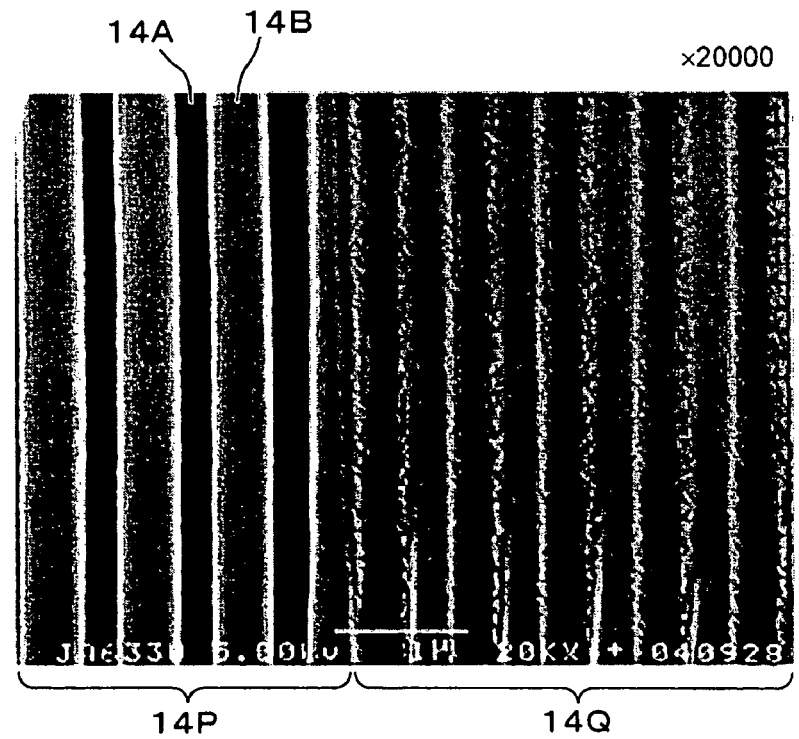

OPTICAL INFORMATION RECORDING MEDIUM AND MANUFACTURING METHOD OF THE SAME

BACKGROUND OF THE INVENTION

1. Field of the Invention

The field relates to a recordable optical information recording medium, such as a DVD-R, DVD+R, Blu-ray Disc or HD-DVD, capable of recording and reproducing information by a laser with respect to a dye and a rewritable optical information recording medium such as a DVD-RAM or DVD-RW, and particularly to a new medium structure to record information for copyright protection or the like.

2. Description of the Related Technology

A DVD includes a main information recording area in which a moving picture and the like are recorded, and a sub-information recording area or a control information recording area in which sub-information and the like are recorded for the purpose of copyright protection or the like. In CPRM (Content Protection for Recordable Media) as copyright protection technology adopted in DVD standards, a specific bar code is formed in the NBCA (Narrow Burst Cutting Area) of a disc on which main information is recorded. Although copyright protection management by the CPRM as stated above has not been performed in a recordable disc such as a DVD-R or a rewritable optical disc, such management has been requested from the viewpoint of copyright protection and countermeasures against copyright infringement. However, when the technology of the DVD is attempted to be directly applied to the optical disc, although the length of the bar code and the recording part on the disc have already been determined by the standard, its physical shape (or structure) is not definite, and accordingly, there is no suitable method under the present circumstances. However, it is important to perform copy control effectively and with high accuracy from the viewpoint of copyright protection, and an effective physical shape of the bar code relating to the CPRM in the optical disc is needed.

As the related art concerning such bar code shape, there is an optical disc and an optical disk reproduction apparatus disclosed in patent JP-A-2001-110062. This has an object to facilitate the formation and reproduction of a bar code, and is characterized in that a stripe-shaped mark long in the radial direction is formed in a specific annular area not used for the recording of main information, and the width of the mark is made a half or less of a mark period.

However, the related art disclosed in JP-A-2001-110062 substantially relates to a ROM optical disc, where a reflection film formed on a substrate is fused, and since a difference in thermal expansion coefficient between the substrate and the reflection film is excessively large, when the reflection film is deformed, it is peeled off and a gap is produced. This has an influence on jitter (fluctuations) at the time of data readout, and there is error because the jitters can not be sufficiently suppressed.

In addition, recently, the speed of recording and reproduction of data to and from the optical disc has been increased, and a bar code formation method is needed which can sufficiently deal with the increased speed so that defective readout or the like does not occur even at the time of high speed.

SUMMARY OF THE INVENTION

The invention has been made in view of the above, and has an object to provide a new medium structure to record a bar code for copyright protection or the like in an optical information recording medium capable of recording and reproducing information. Another object is to form a bar code from which information can be effectively read out at high speed.

In order to achieve the object, according to the invention, in an optical information recording medium including a substrate having lands and grooves, a recording layer formed thereon, a main information recording area and a sub-information recording area, the sub-information recording area includes sub-information based on a substrate deformation continuous across plural grooves and lands.

The sub-information is shaped into a bar code form.

The substrate deformation includes at least a deformation of the lands.

The recording layer includes an organic dye.

Besides, in a manufacturing method of an optical information recording medium including a substrate having lands and grooves, a recording layer formed thereon, a main information recording area and a sub-information recording area, when sub-information is recorded in the sub-information recording area by sequentially moving a laser beam in a radial direction of the optical information recording medium, mark pieces are formed, while one ends of the mark pieces, each being formed by one recording processing, overlap with each other, and bar code information of a specified length is formed.

The laser beam has an elliptic shape thinner than a pitch defined by the lands and the grooves.

The sub-information is recorded at an energy density per unit area substantially equal to that of main information recording of the main information recording area.

According to the invention, since the bar code continuous across many grooves and lands are formed by using the dye and by deformation of the substrate, the invention can be suitably adopted for various optical discs. Besides, a readout signal is excellently modulated, and especially even at a high speed operation, bar code information can be read out without fail.

BRIEF DESCRIPTION OF THE DRAWINGS

FIGS. 3A and 3B are views showing SEM photographs showing states of deformation of an optical disc.

DETAILED DESCRIPTION OF THE CERTAIN EMBODIMENTS

Hereinafter, certain embodiments will be described with reference to the figures.

Figure 1:
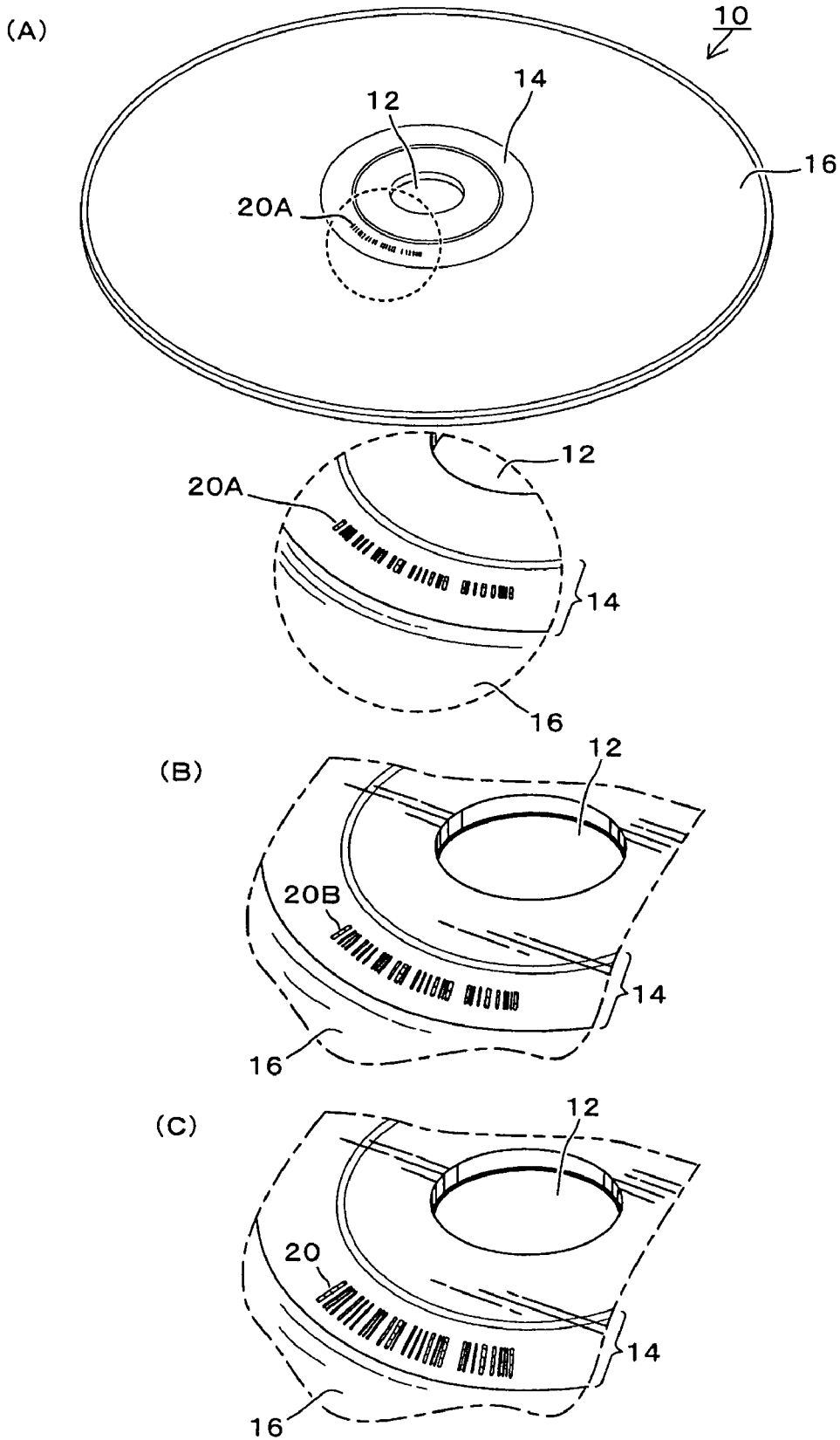
FIGS. 1A to 1C are views showing states of recording of a bar code on an optical disc in an embodiment.

FIGS. 1A to 1C show states of an upper portion of a disc at the time of bar code recording in one embodiment.

As shown in FIG. 1A, an optical disc 10 includes a center hole 12 at its center, and a bar code 20 is recorded in a ring-shaped area (hereinafter referred to as "control information recording area") 14 in the vicinity thereof. Main information such as a moving picture is recorded in a main information recording area 16 at the outer peripheral side thereof.

Figure 2:
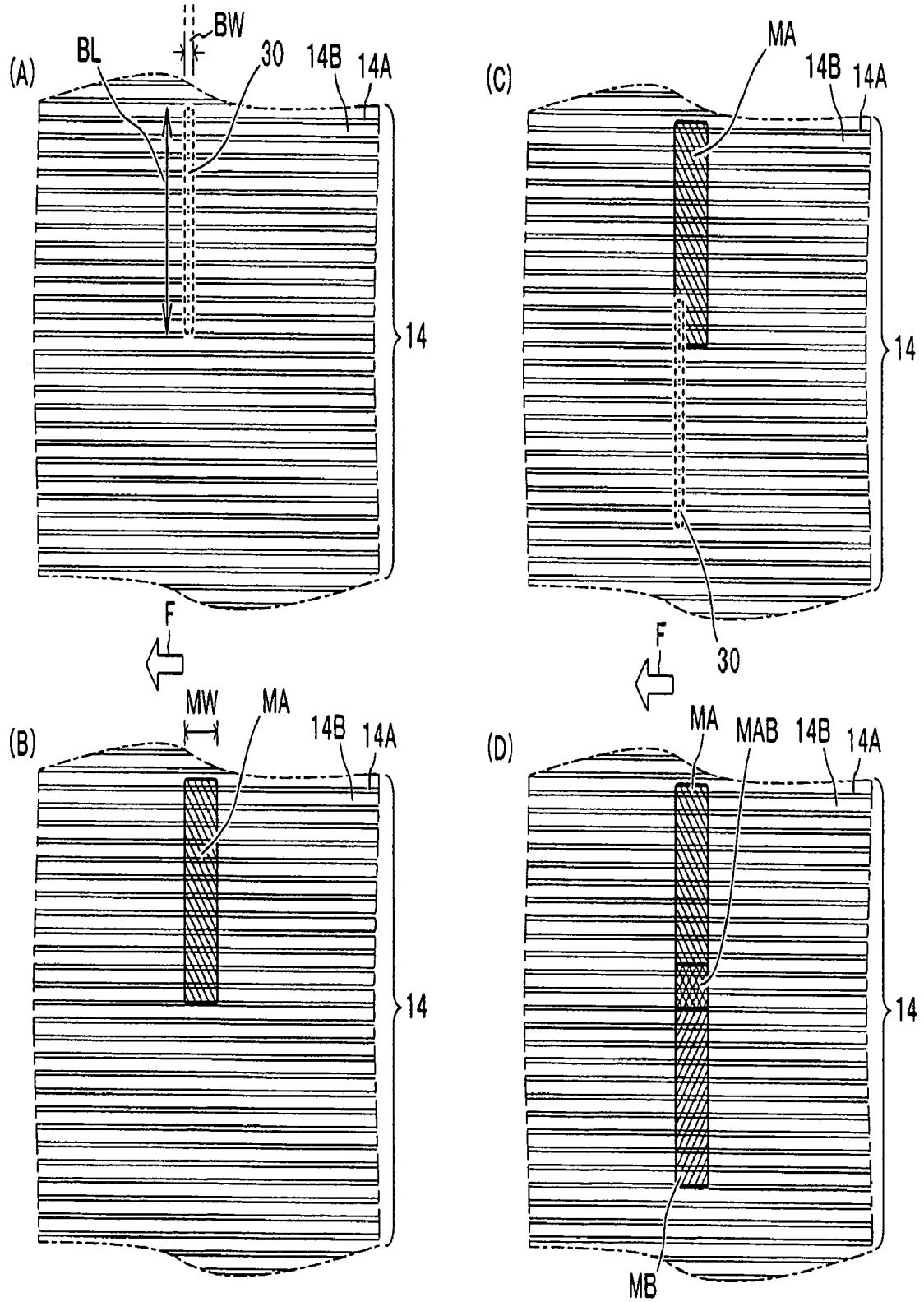
FIGS. 2A to 2D are views showing relation between a laser beam irradiated onto the optical disc of the embodiment of FIGS. 1A to 1C and a recorded mark piece.

FIGS. 2A to 2D show the control information recording area 14 under magnification, and grooves 14A and lands 14B are formed. A recording layer to record information by decomposition of an organic dye is formed to overlap with those. In this embodiment, as shown in FIG. 2A, the recording of the bar code is performed by a thin and long laser beam target area 30. As a recording apparatus to form and irradiate the laser beam target area 30, for example, a well-known NBCA recording apparatus is used. A laser beam is adjusted to be thin and long by using a lens in an optical pickup of the recording apparatus and an elliptic laser beam is obtained. Next, a cylindrical lens is applied to the elliptic laser beam to obtain the laser beam with a specified length (for example, several tens times larger than the width of the groove 14A). Additionally, the aperture of the laser beam and the like are suitably adjusted. For example, the laser beam with a length BL of 48 μm and a width BW of 1 μm may be obtained. As stated above, in this embodiment, the bar code is recorded by using the laser beam target area 30, which is very thin, and long compared to the pitch of the grooves 14A or the lands 14B.

Additionally, because the laser beam target area 30 is very long, the irradiation area of the laser beam target area 30 is rather large. The output power of the laser light is raised so that the dye decomposition can be excellently performed. That is, the laser output is set so that the energy density per unit area is substantially equal to that at the time of normal information recording, when the area of the laser beam target area 30 is smaller.

When the laser beam 30 is irradiated and the optical disc 10 is rotated in the direction of an arrow F of FIG. 2A, the organic dye of the recording layer is decomposed, and as shown in FIG. 2B, a mark piece MA of the bar code 20 is formed. At this time, in this embodiment, the substrate is deformed by heat generated by the dye decomposition. That is, in this embodiment, when the dye layer at the recording place of the mark piece MA is peeled off, the substrate side is already deformed. As stated above, the mark piece MA is formed with the dye decomposition of the recording layer accompanied with the thermal deformation of the substrate.

Further, in this embodiment, the laser beam target area 30 is irradiated onto both grooves 14A and lands 14B, the mark piece MA is formed across both, and at least the land part is deformed. In addition, the groove portion may be deformed. A width MW of the mark piece MA is, for example, 10 μm.

The recording processing of the mark piece as stated above is sequentially performed to form each bar constituting at least a portion of the bar code 20, so that as shown in FIG. 1A, a bar code 20A in which the length of each mark piece MA is shorter than the total length of the bars is formed. The dotted line portion of the figure is shown under magnification.

Next, in this embodiment, as shown in FIG. 2C, the laser beam 30 is shifted to a position where a part overlaps with the mark piece MA. When the optical disc 10 is similarly rotated in the direction of the arrow F, as shown in FIG. 1D, a mark piece MB is formed to overlap with the mark piece MA. In an overlap portion MAB between the mark piece MA and the mark piece MB, the laser beam target area 30 is changed to coincide with the desired location of mark piece MB, which is subsequently irradiated. As compared with a conventional case of one spot irradiation, use of a second mark piece results in a more distinct recording mark bar. That is, the decomposition of the dye is more complete, the substrate is deformed more, and the shapes of the groove 14A and the land 14B are more significantly distorted. By performing the multi-mark piece recording as stated above, the length of the bars of the bar code 20A shown in FIG. 1A is further increased, and a bar code 20B shown in FIG. 1B is obtained. By sequentially repeating the above processing, the length of the bars is sequentially lengthened, and finally, the bar code 20 with a standard length as shown in FIG. 1C is formed.

Figure 4:
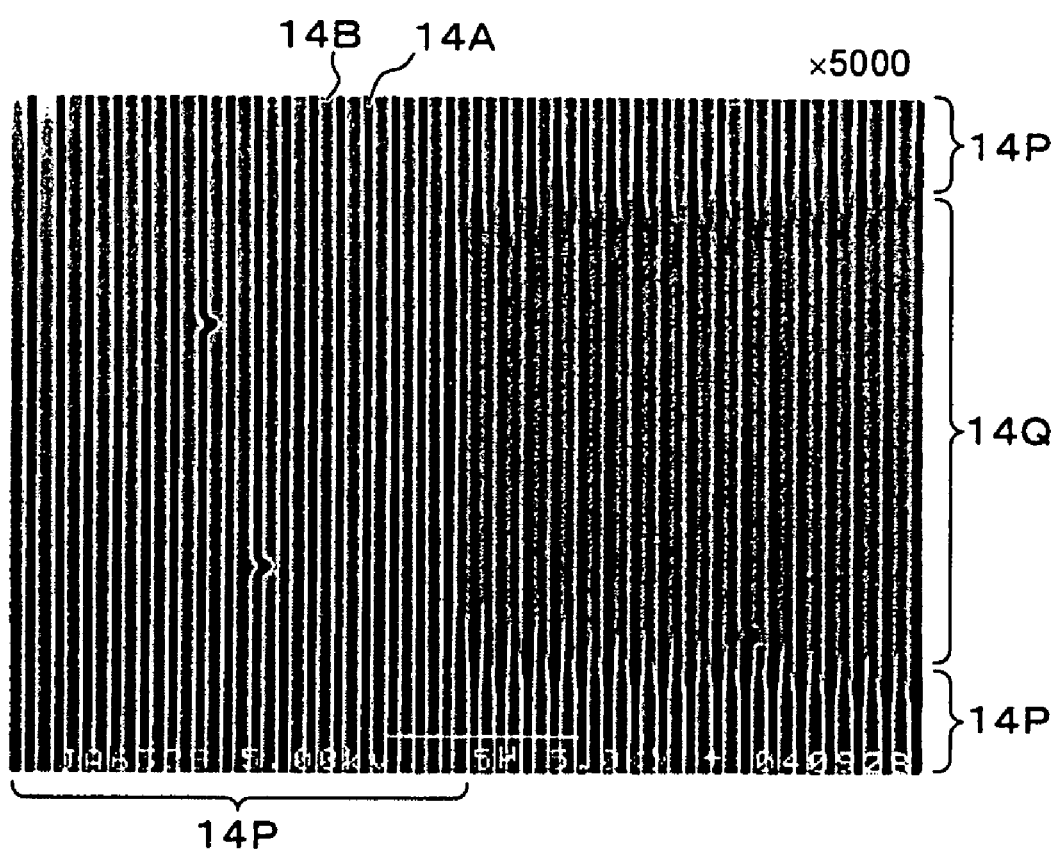
FIG. 4 is a view showing an SEM photograph showing a state of deformation of the optical disc.

FIGS. 3A and 3B and FIG. 4 show SEM photographs of marks formed in one embodiment. The magnification is as indicated in the figures, the dye is removed, and the deformed portion of a polycarbonate substrate and its periphery are photographed. First, FIG. 3A shows the vicinity of a deformed part in the direction orthogonal to the groove and land, and while the groove 14A and the land 14B are clear in a non-deformed portion 14P, those are deformed and boundaries are unclear in a deformed portion 14Q. FIG. 3B shows under magnification the vicinity of an end of a deformed part in the direction parallel to the groove and land, and similarly, while the groove 14A and the land 14B are clear in a non-deformed portion 14P, those are deformed and boundaries are unclear in a deformed portion 14Q. FIG. 4 shows a state of the periphery of the end of the mark piece MA, and a similar result is obtained.

As described above, according to some embodiments, following effects are obtained.

(1) Since the bar code is recorded by the dye decomposition and the substrate deformation across plural grooves and lands, although the reproduction is performed by a normal reproduction apparatus and under a normal condition, the desired modulation factor is more reliably achieved. Accordingly, the optical phase difference in a reproduction signal is sufficiently low.

(2) Since the bar code is written in not only the groove but also the land, it becomes linear microscopically. Conventionally, since the bar code is a spot and is dot-shaped, tracking is required at the time of readout. However, in this embodiment, the tracking becomes unnecessary. Even if the tracking is performed, the bar code can be read out at high accuracy even in the case where some shift occurs. In other words, the accuracy at the manufacturing time can be reduced, and the manufacturing process can be simplified and shortened.

(3) Since not only the recording layer but also the substrate is deformed, there is no such disadvantage that a sufficient amplitude can not be taken in the reproduction signal, and it is preferable also from the viewpoint of copyright protection.

(4) Further, the jitter is reduced as the modulation factor is improved. For example, when the linear velocity of an optical disc is 3 m/s, the modulation factor ($I_{BL}/I_{BH}$) on the standard of DVD is 34%, and when the linear velocity is 7 m/s, the modulation factor is 40%. The substantial amplitude is 66% when the linear velocity is 3 m/s, and it is 60% when the linear velocity is 7 m/s. In general, when the linear velocity becomes high, that is, the speed is increased, the substantial amplitude is hard to take. However, according to this embodiment, the substantial amplitude becomes easy to take. Accordingly, the speed-up can be excellently dealt with, and the application can be made especially to a high density recording optical disc such as a 8× or more DVD-R, DVD+R or Blu-ray Disc.

The invention is not limited to the foregoing embodiments, but can be variously modified within the scope of the invention. For example, the following may also be included.

(1) In one embodiment, although description has been applied to a DVD-R, other embodiments can also be applied to a recordable optical information recording medium to record information by using dye, such as a Blu-ray Disc, DVD+R, CD-R or next-generation discs of HD-DVD or the like, or a rewritable optical disc such as a DVD-RAM or DVD-RW.

(2) In a sample manufactured by way of experiment in relation to the embodiment, although the deformation of a reflection film of a laser beam was not seen, the presence or absence of such deformation is not problematic. Since the bar code is formed of the substrate and the dye in which a difference in thermal expansion coefficient is small, excellent recording characteristics (high modulation factor, low jitter, etc.) can be given reliably.

(3) Numerical values such as the beam length indicated in the discussed embodiments are merely examples, and may be suitably set as the need arises.

(4) Although the embodiment is an example of the case where the groove does not wobble, the invention can be similarly applied even to the case where it wobbles.

Accordingly, since the bar code continuous across many grooves and lands is formed by the use of the dye and the deformation of the substrate, the readout signal is excellently modulated, and information can be read out reliably. Thus, the embodiments are suitable for copyright protection or the like in a recordable optical disc such as a DVD-R, Blu-ray Disc, DVD+R, CD-R or next generation disk of HD-DVD or the like, or in a rewritable optical disc.

What is claimed is:

1. An optical information recording medium comprising:
   a substrate having lands and grooves;
   a recording layer including a dye disposed on the substrate;
   a reflection film disposed on the substrate in a thickness direction;
   a main information recording area; and
   a sub-information recording area in a radial direction,
   wherein the sub-information recording area includes a bar code composed of a plurality of bars crossing grooves and lands and aligned circumferentially, said bars being recorded using the recording layer with the reflection film and defined by an area of the dye decomposed by a laser beam, said area also being defined by grooves and lands thermally deformed by the dye decomposition,
   wherein a height difference between the thermally deformed lands and the thermally deformed grooves in the bars is smaller as a result of the thermal deformation than a height difference between lands and grooves in a portion other than the bars in the sub-information area.

2. The optical information recording medium according to claim 1, wherein the substrate deformation comprises at least a deformation of one or more of the lands.

3. The optical information recording medium according to claim 1, wherein the recording layer comprises an organic dye.

4. The optical information recording medium according to claim 1, wherein the deformation of the lands and grooves are thermal deformation.

5. The optical information recording medium according to claim 1, wherein the bar code is readable without tracking.

6. The optical information recording medium according to claim 1, which is a high density recordable optical disc selected from the group consisting of 8× or more DVD-R, DVD+R, BLU-RAY, CD-R, and HD-DVD.

7. The optical information recording medium according to claim 1, wherein each bar includes a portion where the dye is decomposed more and the grooves and lands are thermally deformed more than those in other portions of the bar.

* * * * *